(12) United States Patent
Urbanek et al.

(10) Patent No.: US 12,440,624 B2
(45) Date of Patent: Oct. 14, 2025

(54) ELECTRONIC ADD-ON MODULE FOR INJECTION DEVICES

(71) Applicant: Ypsomed AG, Burgdorf (CH)

(72) Inventors: Leos Urbanek, Bern (CH); Gabriel Kalbermatter, Burgdorf (CH)

(73) Assignee: Ypsomed AG, Burgdorf (CH)

( * ) Notice: Subject to any disclaimer, the term of this patent is extended or adjusted under 35 U.S.C. 154(b) by 944 days.

(21) Appl. No.: 17/198,012

(22) Filed: Mar. 10, 2021

(65) Prior Publication Data

US 2021/0187200 A1 Jun. 24, 2021

Related U.S. Application Data

(63) Continuation of application No. PCT/IB2019/057866, filed on Sep. 18, 2019.

(30) Foreign Application Priority Data

Sep. 19, 2018 (EP) ..................................... 18195521

(51) Int. Cl.
*A61M 5/315* (2006.01)
*A61M 5/24* (2006.01)
*A61M 5/31* (2006.01)

(52) U.S. Cl.
CPC ... *A61M 5/3157* (2013.01); *A61M 2005/2418* (2013.01); *A61M 2005/3143* (2013.01);
(Continued)

(58) Field of Classification Search
CPC .. A61M 2005/3143; A61M 2005/2418; A61M 5/002; A61M 2005/2477;
(Continued)

(56) References Cited

U.S. PATENT DOCUMENTS 8,652,100 B1 * 2/2014 Cowe .................. A61M 5/2033
604/117
10,283,014 B2 † 5/2019 Baker
(Continued)

FOREIGN PATENT DOCUMENTS

| CH | 713129 A2 | 5/2018 |
|---|---|---|
| EP | 2781230 A1 | 9/2014 |

(Continued)

OTHER PUBLICATIONS

International Preliminary Report on Patentability received for International Application No. PCT/IB2019/057866, mailed on Mar. 23, 2021, 9 pages.
(Continued)

*Primary Examiner* — Emily L Schmidt
*Assistant Examiner* — Samuel J Marrison
(74) *Attorney, Agent, or Firm* — Dorsey & Whitney LLP

(57) ABSTRACT

Implementations relate to an electronic add-on module releasably attachable to an injection device prior to injection, a sensor element for detecting a state or process in the injection device, a processor element for evaluating and/or processing a signal of the sensor element, and an energy store for supplying the processor element with energy. The add-on module has a first module part, which is connectable along its longitudinal axis to the injection device in an axially fixed manner by means of a holding mechanism. A second module part is movable for a damped relative movement, such as a deceleration or braking movement, by a delay stoke with respect to the first module part connected to the injection device. By damping a relative movement between two module parts, the force transmission between the add-on module and the injection device is controlled and a maximum force surge is limited to the injection device.

20 Claims, 8 Drawing Sheets

(52) U.S. Cl.
CPC ... *A61M 2205/50* (2013.01); *A61M 2205/583* (2013.01); *A61M 2205/8206* (2013.01)

(58) Field of Classification Search
CPC .......... A61M 5/326; A61M 2005/3157; A61M 2005/2407; A61M 5/281; A61M 2005/2411; A61M 5/31546; A61M 5/31568
See application file for complete search history.

(56) References Cited

U.S. PATENT DOCUMENTS

| | | | |
|---|---|---|---|
| 10,795,973 B2 † | 10/2020 | Baker | |
| 2011/0004165 A1 | 1/2011 | Iio et al. | |
| 2011/0224616 A1* | 9/2011 | Slate | A61M 5/3202 604/154 |
| 2013/0079718 A1* | 3/2013 | Shang | A61M 5/2033 604/131 |
| 2013/0281936 A1* | 10/2013 | Kemp | A61M 5/28 604/197 |
| 2014/0194826 A1* | 7/2014 | Nielsen | G16H 20/17 604/189 |
| 2015/0025470 A1 | 1/2015 | Baran et al. | |
| 2016/0022922 A1* | 1/2016 | Kemp | A61M 5/3204 604/198 |
| 2016/0193414 A1* | 7/2016 | McLoughlin | A61M 5/5086 604/227 |
| 2016/0354556 A1* | 12/2016 | Zucker | A61M 5/326 |
| 2017/0000950 A1 | 1/2017 | Baran et al. | |
| 2017/0000955 A1* | 1/2017 | McLoughlin | A61M 5/3134 |
| 2017/0259002 A1* | 9/2017 | Laiosa | A61M 5/2033 |
| 2018/0236185 A1 | 8/2018 | Säll et al. | |
| 2019/0060579 A1* | 2/2019 | Daniel | A61M 5/20 |
| 2020/0114082 A1* | 4/2020 | Melander | A61M 5/3148 |
| 2020/0376203 A1 | 12/2020 | Urbanek et al. | |

FOREIGN PATENT DOCUMENTS

| | | | | |
|---|---|---|---|---|
| EP | 3626288 A1 | 3/2020 | | |
| WO | 03011370 A2 | 2/2003 | | |
| WO | 2009152542 A1 | 12/2009 | | |
| WO | 2010037828 A1 | 4/2010 | | |
| WO | 2010098927 A1 | 9/2010 | | |
| WO | 2010128493 A2 | 11/2010 | | |
| WO | WO-2013004843 A1 * | 1/2013 | ............. | A61M 5/24 |
| WO | 2013120774 A1 | 8/2013 | | |
| WO | 2013120775 A1 | 8/2013 | | |
| WO | WO-2013153121 A2 * | 10/2013 | .......... | A61M 5/3157 |
| WO | 2018064784 A1 | 4/2018 | | |
| WO | 2019159035 A1 | 8/2019 | | |
| WO | 2020058875 A1 | 3/2020 | | |

OTHER PUBLICATIONS

International Preliminary Report on Patentability received for International Application No. PCT/IB2019/050927 mailed on Aug. 18, 2020, 9 pages.

* cited by examiner
† cited by third party

Fig. 2A
Fig. 2B
Fig. 2C
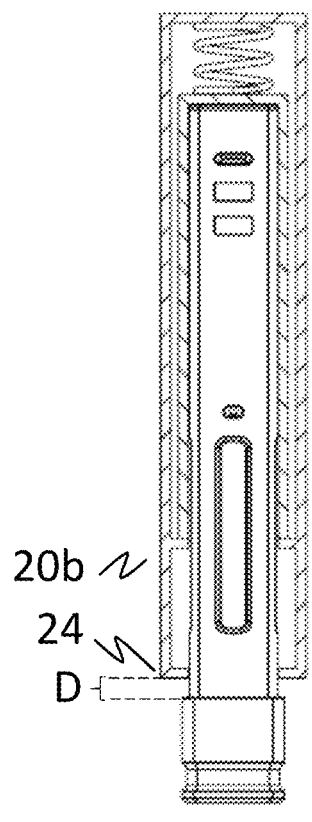
V1
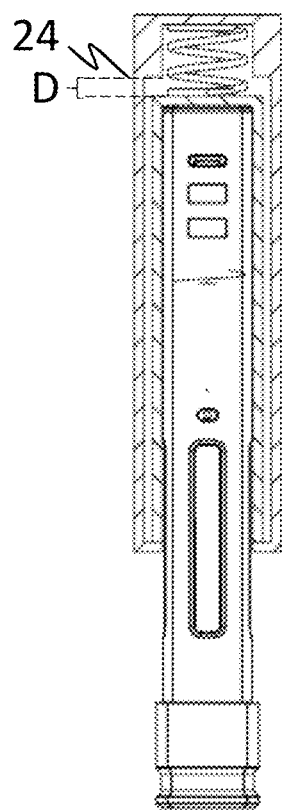
V2
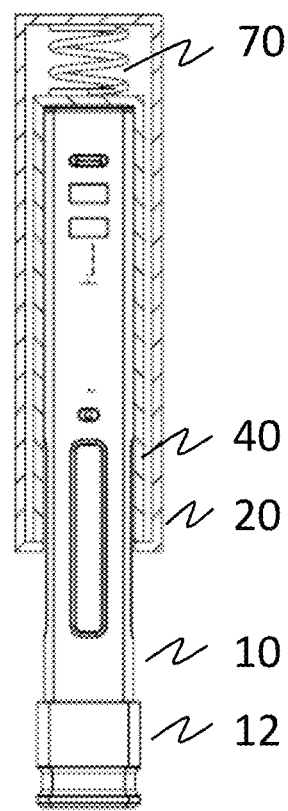
V3
Fig. 3
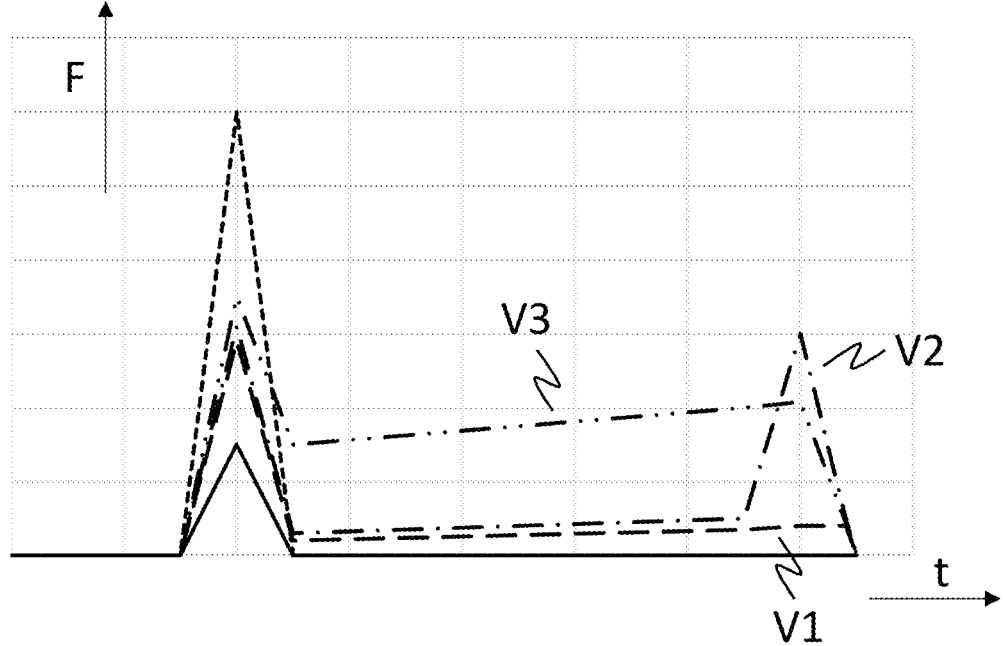

ELECTRONIC ADD-ON MODULE FOR INJECTION DEVICES

CROSS-REFERENCE TO RELATED APPLICATIONS

This application claims priority to International Patent Application No. PCT/IB2019/057866, filed Sep. 18, 2019, entitled "ELECTRONIC ADD-ON MODULE FOR INJECTION DEVICES," which in turn claims priority to European Patent Application No. 18195521.2, filed Sep. 19, 2018, entitled "ELECTRONIC ADD-ON MODULE FOR INJECTION DEVICES", each of which is incorporated by reference herein, in the entirety and for all purposes.

TECHNICAL FIELD

The present disclosure is directed to the field of medical injection devices for administering liquid substances, in particular drugs or medicinal substances such as insulin and hormone preparations. The disclosure more particularly relates to a portable electronic add-on module to be mounted on a medical injection device.

BACKGROUND

The patent application EP 2781230 describes an injection device, also referred to as an autoinjector, for automatic dispensing of a medical substance by means of a preloaded injection spring which presses a stopper into a syringe via a plunger rod. The movement of the stopper brings about a dispensing or delivery of the substance through a needle on a distal end of the syringe. Optionally, the injection spring or an additional energy storage element can also automatically perform an injection movement of the syringe in the distal direction relative to a housing of the injection device. The injection device further comprises a needle protection sleeve which can be shifted in a longitudinal direction between a proximal position and a distal position. The needle protection sleeve is coupled with a needle protection sleeve spring as a separate drive element which shifts the needle protection sleeve, after the substance delivery has occurred, into the distal position in which it laterally surrounds or shields the needle. A movable stop element is accelerated toward a stop by the needle protection sleeve spring and acts as a feedback device for generating an acoustic signal after the delivery of a certain quantity of substance, e.g., an end signal. A second feedback device with a stop element accelerated by the dispensing spring signals the beginning of the substance delivery, e.g., a start signal.

The patent application WO 2018/064784 describes a portable, reusable electronic add-on module to be mounted on a proximal end of an injection device. The add-on module comprises an inductive sensor for detecting a movement of a magnetic or electrically conductive component of the injection device between an output position and an intermediate position, and between the intermediate position and an end position during a dispensing process. This allows a simple and reliable control and monitoring of injection device use.

Placing an add-on module on the injection device adds additional weight to the injection device and thus increases the inert mass of the device components carried by the add-on module. If the injection device with the add-on module mounted falls to the floor from the edge of a table before the injection, the injection device can be exposed to additional stress as a result. If the add-on device is mounted on the proximal end as a carrier component of the injection device and if a distal end strikes the floor as the impacting component of the injection device, the junctions between the carrier component and the impacting component are considerably stressed. If the impacting component is connected to the carrier component only via an interface or contact site of small dimension and therefore insufficiently connected by non-positive connection, this can result in damage at the interface. This can occur, for example, if the housing of the injection device functions only as a carrier component and if the needle protection cap remover, as an impacting component, can be shifted with respect to the housing, in the process moving the syringe holder along as an additional device component. Consequently, the syringe holder can hit a stop secured to the housing and be damaged in the process. In the case of an impact against a needle protection cap remover of the injection device, the needle protection sleeve can also be accelerated with respect to the injection device, and, as a result, a locking mechanism of the needle protection sleeve can be negatively affected, so that the needle protection device no longer functions as intended after the injection process. Since, as a result of such an impact, the injection device is not necessarily spontaneously triggered or does not necessarily suffer damage that can be visually recognized from the outside, a user may under some circumstances still wish to use the injection device without being aware of possible functional impairments from the impact.

In this context, the term "drug" or "medical substance" comprises any flowable medical formulation which is suitable for the controlled administration by means of a cannula or a hollow needle, for example, of a liquid, a gel, or a fine suspension containing one or more medically active substances. A drug can thus be a composition with a single active substance or a premixed or co-formulated composition with a plurality of active substances from a single container. In particular, the term covers medicines such as peptides (for example, insulins, insulin-containing drugs, GLP-1-containing drugs, as well as derived or analogous preparations), proteins and hormones, biologically prepared or active substances, active substances based on hormones or genes, nutrition formulations, enzymes and additional substances in solid (suspended) or liquid form. The term moreover also covers polysaccharides, vaccines, DNA or RNA or oligonucleotides, antibodies or parts of antibodies, as well as suitable base, adjuvant and carrier substances.

SUMMARY

Implementations are configured to minimize additional mechanical stressing of individual components of an injection device caused by an add-on module mounted on the injection device. This is achieved by providing an add-on module as disclosed herein and by a use of injection device with such an add-on module.

According to implementations, before the start of an injection, an electronic add-on module is releasably placed or mounted on an injection device with a longitudinal or main axis that connects an insertion-side distal end to an opposite proximal end. The add-on module includes a sensor element for detecting a state or process in the injection device, a processor element (or elements) for evaluating and/or processing a signal of the sensor element, an energy storage for the energy supply of the sensor and/or the processor elements, and optionally a communications unit for wireless communication of data of the processor elements. The add-on module comprises a first module part which, in the direction of the longitudinal axis, can be connected to the injection device in an axially fixed manner within the limits of manufacturing tolerances and which, in the mounted state, is connected by a holding mechanism to the injection device in an axially fixed manner. The add-on module, in addition, comprises a second module part which can be moved at least in a distal direction parallel to the longitudinal axis for a relative movement with respect to the first module part, for instance, for a damped deceleration or braking movement. During relative movement, the first module part remains connected to the injection device in an axially fixed manner, and the holding mechanism remains effective independently of the relative movement until a release unit is actuated; thus, for example, the relative movement does not lead to the release of the add-on module from the injection device. The holding mechanism for connecting the injection device and the first module part in an axially fixed manner is preferably a positive connection and, for this purpose, it comprises, for example, holding elements on the first module part, which are engaged with positive connection in recesses in the injection device, such that the holding mechanism in particular does not comprise a coil spring positioned proximally with respect to the first module part and coaxially with respect to the longitudinal axis, for a non-positive-connection, (merely) pressing of the first module part against the injection device.

According to implementations, by the relative movement between two module parts following an impact, the force and/or energy transmission between the add-on module and the injection device in the direction of the longitudinal axis is controlled, and, in particular, a maximum force surge onto the injection device is decelerated and preferably also limited. At the end of a relative movement with an amplitude between 0.2 and 10 millimeters, and preferably between 0.5 and 5 millimeters, the second module part can impact an end-stop on the first module part or on the injection device and/or it can be clamped to the first module part or the injection device via surfaces which are in an angled position with respect to the longitudinal axis. Thus, a maximum action of the inert mass of the first module part occurs only at the end of the relative movement and thereby with a delay with respect to the direct action of the inert mass of the first module part. The stressing of the carrier component of the injection device, which is connected to the first module part in an axially fixed manner, and the stress on the interfaces between the carrier component and additional components of the injection device are as a result distributed with lower intensity over the relative movement.

In some implementations, the add-on module comprises a damping element which is different from the module parts, in order to dampen the relative movement between the module parts. The damping element can be provided directly between the two module parts, or it can act between the second module part and the injection device. The damping element can be designed so that it can completely absorb the kinetic energy of the second module part. Alternatively, the damping element can reach its capacity, for example, by a maximum compression of a compression spring, wherein, subsequently, as in the case of an explicit end-stop, the deceleration force of the second module part is taken over by the carrier component of the injection device. Preferably, the damping element includes an elastic spring component for storing potential energy and/or a non-elastic dissipation component for dissipating the kinetic energy of the second module part and for a preferably aperiodic oscillation damping. The dissipation occurs, for example, by a frictional connection of the spring component with a wall or by an integrated or separate friction element. A completely non-elastic damping with a plastic deformation of the damping element can also be useful at least for a one-time damage prevention on the injection device.

For the purposes of the present disclosure, the term damping also includes an approximately elastic spring action, so that kinetic energy of the second module part is dissipated by the damping during the deceleration and/or converted by the spring action into potential energy. At the end of a damped deceleration stroke with an amplitude between one and ten millimeters, and preferably between two and four millimeters, the second module can impact a deceleration end-stop on the first module part or on the injection device, and/or it can be clamped to the first module part or the injection device via surfaces which are in an angled position with respect to the longitudinal axis. Thus, the deceleration force of the inert mass of the second module part can be temporally distributed over a duration of the deceleration movement and be transmitted with corresponding damping or moderation. The stressing of the carrier component of the injection device, which is connected to the first module part in an axially fixed manner, and the stressing of the interfaces between the carrier component and additional components of the injection device are decreased as a result.

In some alternatives, the inert mass of the second module part is greater than the inert mass of the first module part. In particular, the energy storage may be a component of the second module part.

In some implementations, the sensor element is arranged in the first module part. Thereby, it is ensured that the sensor element is positioned axially as intended and oriented toward the signal component of the injection device that is to be detected. During the dispensing process, an axial spacing in the longitudinal direction between the sensor element and the signal component thus does not depend, for example, on a holding force of the user who grips the add-on module by the second module part and presses it against the injection site. In addition, vibrations of components of the injection device are better transmitted to an acceleration sensor or a gyroscope as sensor element in the first module part, which is firmly connected to the injection device. The sensor element(s) may produce an analog electrical sensor signal which is transmitted via a flexible connection independently of said axial spacing to a sensor control unit of the processor elements independently of said axial spacing. The sensor elements ensure a contactless inductive, capacitive, optical, acoustic detection, or a contact-based detection of a position or of a state of components of the injection device. Alternatively, sensor elements which tolerate axial shifting can also be mounted on the second module part, in particular in a housing insert or in the electronics unit and connected via rigid conductor tracks to the processor unit.

In embodiments, the second module part comprises a stop or a stop surface, which, at the end of a deceleration or braking movement decelerated by a damping element or the damping element can strike or impact a deceleration end-stop or a counter-end-stop of the injection device or of the first module part. By means of this stop, the amplitude or the stroke of the deceleration movement is limited. Correspondingly, the damping element can have a lower damping constant and/or the deceleration stroke can have a smaller length than in an embodiment with a damping element designed for complete absorption of the kinetic energy of the second module part. This stop can at the same time also receive a holding force of the user who grips the add-on module by the second module part and presses it against the injection site.

The damping element may be a helicoidal or coil spring which is preloaded when the add-on module is mounted on the injection device and it thus also serves as a receiving or mounting spring. Here, the two module parts are shifted with respect to one another along a receiving path, wherein the damping element is compressed or expanded in the axial direction. The preloaded damping element is prevented from relaxation by latching or fixation of the first module part in the preloaded position; however, for damping according to implementations, the damping element can be tensioned further in the longitudinal direction. As a damping element, other springs such as, for example, a clip spring formed from a spring wire, a leaf spring, a spring element made of plastic, or a non-elastic damping element would also be conceivable.

In some implementations, the first module part comprises an internal space for an encapsulated reception of the second module part, and the second module part, or at least the energy storage, performs the deceleration movement within this internal space. The first module part thus protrudes or has a protrusion in the radial direction, which is adapted to the dimensions of the second module part. The first module part defines a receiving volume for the injection device and can include a holding element with elastic module wings for the lateral snapping on or axial slipping on of the add-on module onto the injection device.

In alternative implementations, the first module part comprises an internal sleeve as a receiving unit for the injection device, which surrounds the received injection device in the axial direction over a length of at least 2 cm and preferably 5 cm on all sides, and the second module part at least partially surrounds an external module housing which at least partially surrounds the internal sleeve. Here, the second module part may comprise a grip or a gripping region or position for gripping the add-on module and the injection device, extending in the direction of the longitudinal axis and corresponding to at least half of the width of the hand of a user. This gripping region covers and may replace a gripping region of the injection device, which would be chosen by the user when using the injection device without the add-on module. Alternatively, the second module part can be offset axially with respect to the first module part, and the grip can be provided on the first module part. The holding mechanism may include holding elements attached laterally on the internal sleeve for radial engagement in lateral recesses of the injection device. Correspondingly, the internal sleeve extends in the longitudinal direction along a length that corresponds at least to the distance between the proximal end of the injection device and the position of the recesses, and the recesses may be different from any viewing windows in the injection device and may be provided proximally thereto.

In addition, the add-on module in the coupled state may be positioned so that a distally directed stop surface or stop edge of the second module part is opposite a proximally directed deceleration end-stop surface or edge of a needle protection cap remover and strikes said needle protection cap remover at the end of the damped relative movement of the module parts. Thereby, the remaining kinetic energy of the second module part of the add-on module is deflected via the needle protection cap remover, and the carrier component of the injection device is unburdened. The deceleration path or the amplitude of the deceleration stroke and the damping of same may be reduced toward zero or at least to manufacturing tolerances or to a minimum necessary for radial movements of a holding element. Alternatively, and in particular in axially shorter add-on modules, a proximally oriented surface or edge of the injection device or of the first module part functions as a deceleration end-stop for the second module part.

In additional embodiments, the first module part comprises a holding element, in particular a holding arm with a projection for engaging in a recess of the injection device, and the second module part comprises a release unit for limiting a movement of the receiving unit in the distal direction with respect to the module housing. The release unit includes, in particular, a release button with an actuation surface which can be moved in the radial direction, perpendicularly to the longitudinal axis. In a holding configuration, the release unit prevents a release movement of the receiving unit, and the holding element holds the injection device in an axially fixed manner in the receiving unit. The holding element may be locked in the holding configuration by the module housing. In a release configuration, the add-on module releases the receiving unit from the release unit and the injection device from the holding element. The add-on module can be moved from the holding configuration into the release configuration by a release movement of the receiving unit, and from the release configuration back into the holding configuration by a receiving movement.

Moreover, the release unit includes a guiding cam (or projection) and the receiving unit includes a locking cam (or projection), wherein, in the holding configuration, the guiding cam cooperates in such a manner with the locking cam that the receiving unit is prevented from a movement in the distal direction with respect to the housing. However, the receiving unit can still be moved for a deceleration movement under continued compression of the receiving spring. The locking cam can also be provided on the injection device, at a site which can come into contact with the guiding cam, such as through a recess in the receiving unit. Furthermore, the guiding cam can be shifted along a securing path and from a holding position in which the guiding cam cooperates with the locking cam, into a release position in which the locking cam is released by the guiding cam. The guiding cam can be preloaded by a release button spring as an elastic securing element into its holding position and it is secured in said holding position.

In an additional embodiment, the add-on module includes a release assistance for the release movement in the form of an elastic spring element which, when a release unit or the release unit is actuated for removing the injection device, is first tensioned or loaded and subsequently relaxes as a result of the same actuation movement. Thereby, the previously received energy is released again for the release movement of the receiving unit in the distal direction for the release configuration. By this assisted release movement, the holding elements are released from their engagement into the injection device, so that the injection device can subsequently be removed from the add-on module without additional force expenditure by the user. Likewise, by this movement, an indicator edge for signaling the release configuration can become visible.

As described above, for the final detachment or removal of the injection device from the add-on module, a release assistance can also be helpful independently of the relative movement in the received or inserted state of the injection device. This is the case, in particular, if the injection device is surrounded at least essentially completely by a module housing of the add-on module and/or if it has less suitable gripping regions via which a user could apply forces for releasing holding elements from their engagement with the injection device. Otherwise, this is also the case if a damping element for damping the relative movement is provided, but not tensioned when the injection device is inserted or not available as release assistance for other reasons.

An electronic add-on module which has been extended or augmented in this manner is detachably mounted on or plugged to an injection device with a longitudinal or main axis which connects an insertion-side distal end to the facing proximal end of the injection device. The add-on module comprises a sensor element for detecting a state or process in the injection device, a processor element for evaluating and/or processing a signal of the sensor element, an energy storage for supplying energy to the sensor and/or the processor element, and optionally a communication unit for wireless communication of data of the processor element. The add-on module comprises a module housing which, in the direction of the longitudinal axis, can be connected in an axially fixed manner to the injection device by a holding mechanism in the context of manufacturing tolerances, and which, in the mounted state, is connected in an axially fixed manner to the injection device. The add-on module comprises a release unit for releasing the holding mechanism and for moving the injection device into a release position. According to implementations, a release assistance for the release movement is provided in the form of an elastic spring element which, when the release unit is actuated for removing the injection device, is first tensioned or loaded and which subsequently relaxes as a result of the same actuation movement. Thereby, the previously received energy is delivered again for the release movement of the injection device in the distal direction.

An add-on module according to implementations can also comprise a communication unit for wireless communication with a mobile device, for example, a cell phone or a smartphone, and/or for an optical, acoustic or tactile state display. A displayed state can include a device state of the injection device, a module state of the add-on module, or a process state of an ongoing or completed injection process. The state display of the add-on module can be kept simple and be limited to a few LEDs, for example, in traffic light colors, and/or an acoustic signal generator for generating voice-independent sounds or melodies. This is advantageous particularly in connection with the advanced graphic display possibilities and speech output possibilities of a smartphone, since the smartphone, coupled wirelessly to the add-on module, takes over the refined communication with a user, which goes beyond a status display. The state information can include an indication of the expiration of a holding time or a waiting time, during which the user must wait after the dispensing has been completed, before the injection device can reliably be removed from the injection site. A simple acquisition of the time that has expired since the detected end of dispensing and a comparison with a target duration makes it possible to display for the user the time when the injection device can be safely removed. This can occur both by means of an add-on module with a time acquisition function and also by means of a real-time event transmission to the mobile device coupled to the add-on module.

An add-on module may be used repeatedly for monitoring a use or actuation of automatic disposable injection devices or autoinjectors. In particular, the add-on module may be suitable for retrofitting existing injection devices which are not available for adaptation or modification. In this configuration, in the injection device, no sensors are provided for acquiring or processing sensor data on the operation of the device, and also there is no communication interface for transmitting this data to a receiver. Accordingly, the sensor elements in the add-on device may need to be configured and positioned in such a manner that they can detect the state changes or primary signals from within the injection device.

The person skilled in the art can directly and in an obvious manner recognize additional embodiments and designs which result from combinations of the described examples or from combinations of the described examples with the general expert knowledge of the person skilled in the art.

BRIEF DESCRIPTION OF THE DRAWINGS

In connection with the appended figures, implementations of the present disclosure are described below. They are intended to show basic possibilities of the implementations and should not be interpreted as limiting.

FIGS. 2A-2C show various implementations of the add-on module of the present disclosure in a starting state, according to certain implementations;

FIG. 3 is an illustration of a force action curve in the case of an impact of the injection device, according to certain implementations ($V^1$-V3 in FIGS. 2A-2C);

DESCRIPTION OF THE FIGURES

Figure 1A:
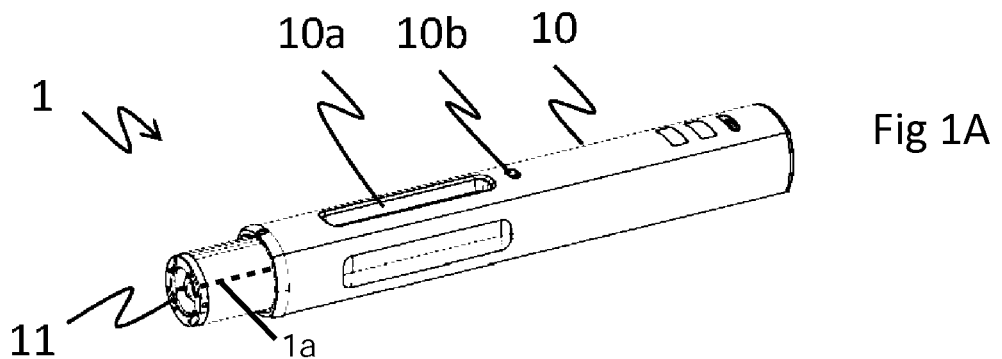
FIGS. 1A-1C show a perspective view of an injection device, an add-on module, and the add-on module connected to the injection device, respectively, according to certain implementations.
Figure 1B:
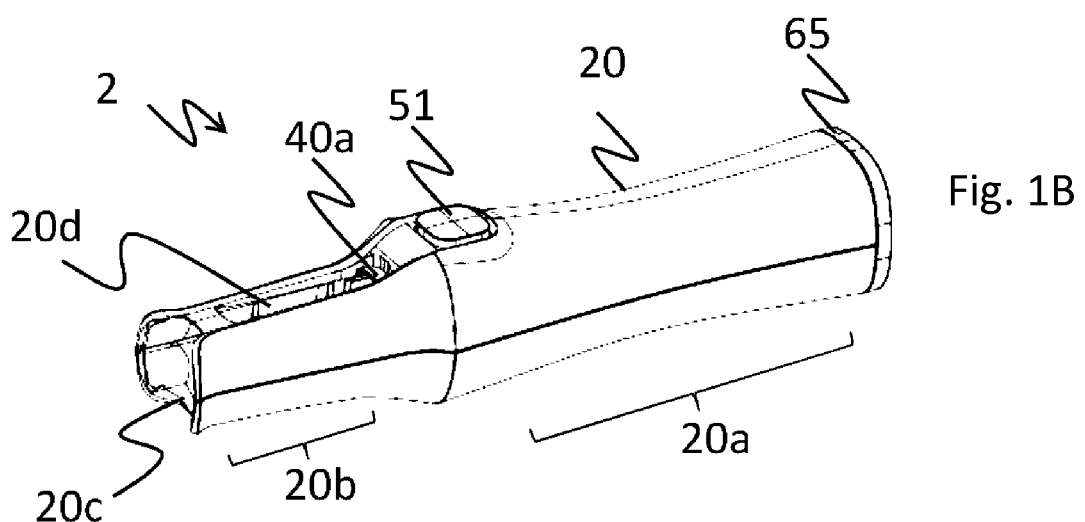
Figure 1C:
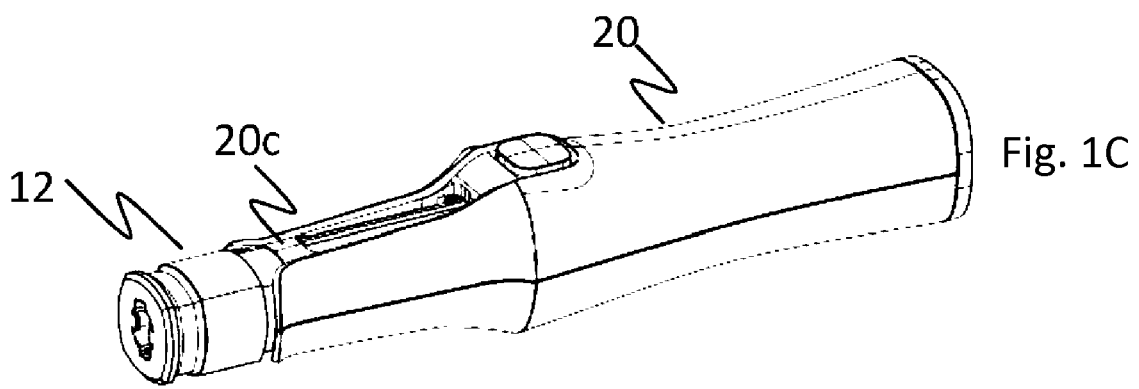

FIGS. 1A-1C show an injection system with an injection device 1 (FIG. 1A), an add-on module 2 (FIG. 1B) in their separated states (FIGS. 1A and 1B, respectively), and in the mounted or coupled state (FIG. 1C). The injection device 1 comprises a longitudinal device housing 10, which is symmetric about a longitudinal axis, including windows 10a enabling a syringe body to be viewed, recesses 10b configured for attachment to the add-on module, and a needle protection sleeve 11, which can be shifted between a first position (e.g., FIG. 1A) shielding a needle 1a of the injection device and a second position releasing or exposing the needle. The injection device 1 inserted into the add-on module 2 is shown with a needle protection cap remover 12, which, in the delivered state, is mounted on a distal end of the injection device and mechanically protects the needle. The needle protection cap remover 12 is removed or pulled off before the injection, together with a needle protection cap, e.g., mounted on an injection needle.

The add-on module 2 has an elongate sleeve-shaped module housing 20 with an internal volume configured for receipt of the injection device 1, e.g., the module housing 20 is adapted to receive an outer shape of the device housing 10. The add-on module 2 may thus serve as a carrier component of the injection device 1, so that the injection device 1 can be inserted into the add-on module 2 for coupling the injection device 1 thereto. The add-on module 2 includes an actuation surface 51 for decoupling (or release) from the injection device 1. The add-on module 2, on a proximal end, includes an indicator light (e.g., via a light guide 65 and light sources of the electronics unit 60 described herein) for providing an optical state display for visual feedback to a user. As illustrated in FIG. 1B, the module housing 20 includes a slightly concave gripping region 20a which may be limited distally by a slight elevation or a region with increased diameter to facilitate the absorption of a force exerted by the user.

In the distal direction, the add-on module 2 includes two links 20b or longitudinal arms which are slightly bent outward on their distal end and connected to one another by stabilizing stop ridges 20c. Between the links and limited by the stop ridges 20c, lateral longitudinal openings 20d are formed, which in the coupled state to the injection device 1, are aligned with the windows 10a of the device housing 10 and allow a user to view a substance stored in the injection device 1. In a state without the inserted injection device 1 (FIG. 1B), an indicator edge 40a of a longitudinal shiftable receiving unit 40 can be viewed in the longitudinal opening 20d. By means of the inserted injection device 1, this indicator edge 40a is shifted proximally into the module housing 20. A distal end surface of the links 20b is located opposite a proximal edge of the needle protection cap remover 12 with a spacing of a few millimeters in the axial direction.

The device housing 10 and the module housing 20 may have an approximately square shape in cross section, wherein each side of the square is curved slightly outward. In the following description, for the sake of simplicity, a direction from the middle longitudinal axis of the housing 20 outward is referred to as radial direction.

FIGS. 2A-C show three different implementations, V1, V2, V3 of the add-on module 2, according to the present disclosure, each in the starting state before the needle protection cap remover 12 is pulled off. For each implementation, a respective view of an injection device 1 with device housing 10 and needle protection cap remover 12 is shown, as well as a section through a mounted add-on module 2 with a first module part as receiving unit 40, axially connected to the device housing 10 as carrier component, and with a second module part comprising a module housing 20. The two module parts are connected or elastically coupled via a damping element 70.

FIG. 3 is a diagram showing a temporal course of the force action on the carrier component (housing 10), starting with an initial loading at the time of an impact of the needle protection cap remover 12 and followed by a deceleration loading during a relative movement of the two module parts 10, 20, and of a final loading. The force curve is represented for the injection device without a mounted add-on module (minimum initial loading—solid line), for a mounted single-part add-on module (maximum initial loading—short dashed line), as well as for each of the three variants V1, V2, V3 according to the present disclosure (reduced initial loading followed by deceleration loading).

Variant one (V1, FIG. 2A, left) corresponds to the configuration shown in FIG. 1B in which the second module part has extended longitudinal links 20b and is arranged so that a distally directed stop surface 24 of the longitudinal link is located opposite a proximally directed deceleration end-stop surface of the needle protection cap remover 12 with a spacing D of a few millimeters. After a damped deceleration stroke with amplitude D (FIG. 2A), the stop surface 24 hits the needle protection cap remover 12, and the deceleration stroke or the braking movement of the second module part is thus limited by an end surface of the needle protection cap remover 12 serving as an end stop surface. When the two stop surfaces are in contact, no additional loading of the carrier components occurs, and the final loading thus remains at the level of the deceleration loading, as represented in FIG. 3.

In variant two (V2, FIG. 2B, middle), the add-on module 2 is shorter than in variant one and is not provided with extended distal longitudinal links 20b, or alternatively, the needle protection cap remover 12 has been removed from V1 of FIG. 2A beforehand. In FIG. 2B, a distally directed stop surface 24 in the interior of the module housing 20 is located opposite a proximally directed deceleration end-stop surface of the first module part, i.e., the receiving unit 40, with a spacing D of a few millimeters. The damped relative movement of the module parts thus ends after a deceleration path D, after which the deceleration force of the second module part is taken over by the carrier component. This leads to a force action on the carrier component, represented in FIG. 3, which is elevated in comparison to the level of the deceleration load. In variant two, the stop surface 24 is also pressed for the absorption of a holding force of the user who grips the add-on module 2 by the second module part and presses on the injection site.

In variant three (V3, FIG. 2C, right), an elastic damping element with an increased damping or spring constant and/or with a long deceleration or spring path between the two module parts, e.g., module housing 20 and receiving unit 40, is provided. Thereby, the kinetic energy of the second module part is completely absorbed in the elastic damping element, and a hard stop between the two module parts no longer occurs. The force transmission between the two module parts is distributed better over time, and the deceleration load onto the carrier component persists up to the maximum compression of the damping element 70 on a level which is increased with respect to variants one and two, as represented in FIG. 3.

Figure 4:
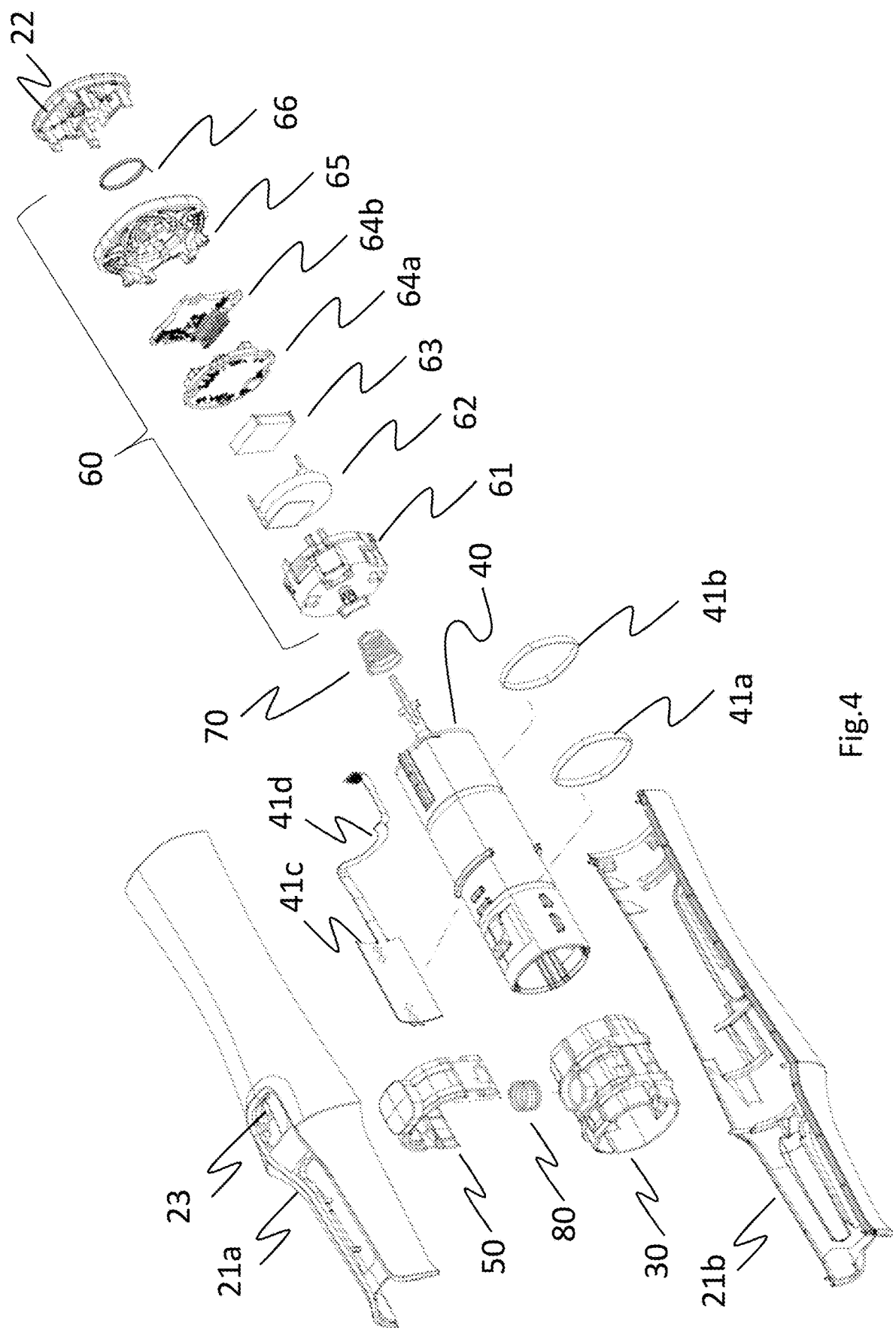
FIG. 4 shows an exploded view of the individual components of the add-on module, according to certain implementations.

FIG. 4 shows an exploded view of the individual components of an add-on module 2 according to implementations of the present disclosure, including variants one through three of FIGS. 2A-2C. The add-on module 2 comprises a module housing 20 including multiple parts with an upper housing half 21a, a lower housing half 21b connected thereto, a housing closure 22, a housing insert 30, a receiving unit 40, a release button 50, an electronics unit/elements 60, a damping element 70, and a release button spring 80.

The upper and the lower housing halves 21a, 21b each have an approximately semi-circular shape, and they are nondetachably snapped on and/or connected to one another, e.g., by ultrasound welding, laser welding, gluing or bolting.

Due to the shape of the housing halves, an internal space is formed between them. On a proximal end, the internal space is limited by the housing closure 22 or a closure wall between the housing halves. On the distal end, the housing halves form an opening toward the internal volume or space. In the internal space, the housing insert 30, the release button 50 and the electronics unit 60 are arranged in an axially non-movable manner. In a middle region between the gripping region 20a and the links 20b (FIG. 1B), the upper housing half 21a comprises a radial opening 23 through which an actuation surface 51 of the release button 50 protrudes in the mounted state.

The receiving unit 40 is mounted in an axially movable manner in the module housing 20, as described below, and furthermore comprises sensor elements, which may be in the form of two inductive sensor elements or sensor coils 41a, 41b which are arranged in corresponding circumferential grooves in an outer surface of the receiving unit 40. The sensor coils 41a, 41b are contacted or electrically connected on a shapeable or flexible carrier via a circuit board 41c, which may be in the form of a printed circuit board, including a flexible conductor 41d (also known as flexprint). Laterally between the two inductive sensor coils 41a, 41b, the circuit board 41c can comprise a NFC (Near Field Communication) coil for reading information of an RFID (Radio Frequency Identification) label on the injection device. A flexible connection 41d in the form of a wire, a cable, or, as represented, as a continuation of the circuit board 41c, e.g., printed conductor tracks of the mentioned flexible conductor 41d for the transmission of signals of the sensor coils 41a, 41b and of the NFC coil leads to circuit boards 64a, 64b (e.g., processor elements) of the electronics unit 60. The flexibility of this signal connection allows compensation of the varying axial spacing between the receiving unit 40 and the electronics unit 60.

The electronics unit 60 is arranged in a proximal region of the internal space in such a manner that it directly adjoins the housing closure 22 and comprises an electronics holder 61, an energy storage with battery 62 and accumulator/rechargeable battery 63, a first and a second circuit board 64a, 64b with light sources and processor elements for processing signals of the sensor coils 41a, 41b, for actuating the light sources, and for communication with additional external devices. The electronics unit 60 moreover comprises a light guide 65 which guides the light of the light sources to the surface of the module housing 20, and an antenna 66 for setting up a communication connection with a third device, in particular for out-of-band pairing for initiating a Bluetooth or other wireless connection.

Between a proximal end surface of the receiving unit 40 and a distal end surface of the electronics holder 61 (the end surfaces may be oriented at a right angle with respect to the longitudinal axis of the housing), is an elastic damping element 70 in the form of a compressed or compressible coil spring. The damping element 70 pretensions the receiving unit 40 in the distal direction via the end surface. The damping element 70 can also be provided between other components of the module housing 20 and of the receiving unit 40 or of the injection device 1 in such a manner that it acts axially to dampen relative movement between the add-on module 2 and the injection device 1.

Figure 5A:
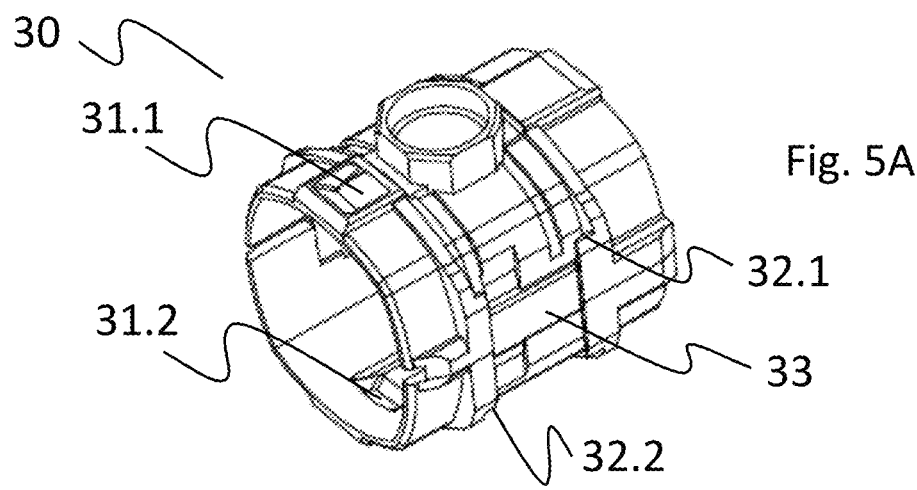
FIGS. 5A-5C shows detailed views of certain components of the add-on module of FIG. 4, according to certain implementations.
Figure 5B:
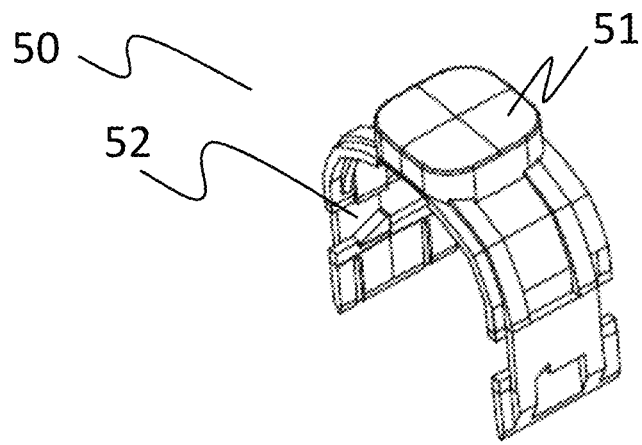
Figure 5C:
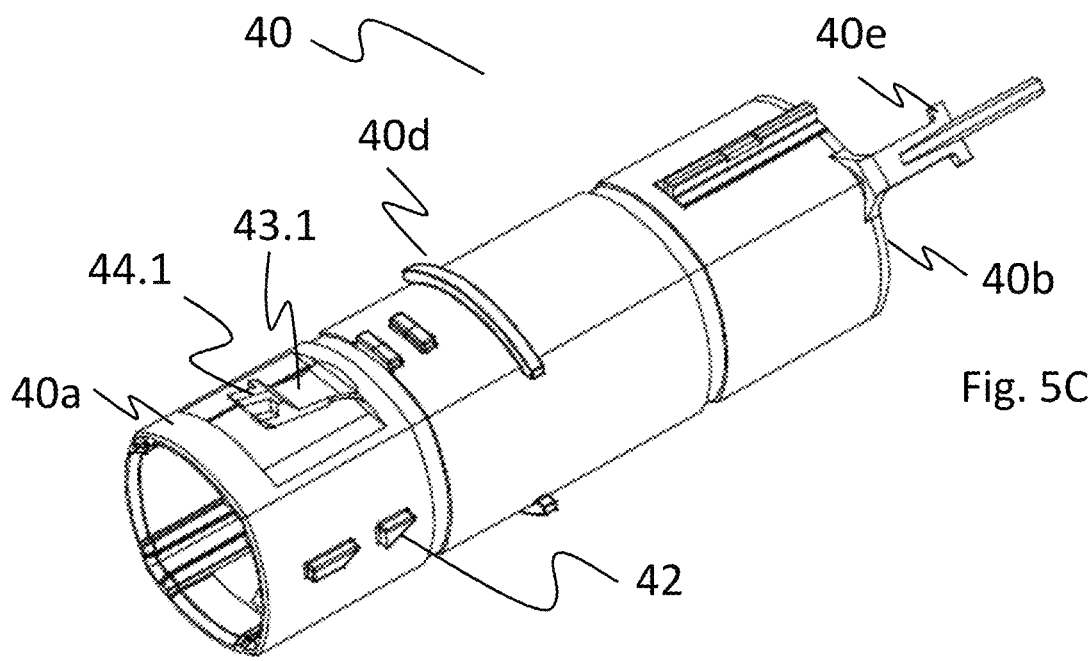

FIGS. 5A-5C show perspective views and further details of components of the housing insert 30 (FIG. 5A), the receiving unit 40 (FIG. 5C), and the release button 50 (FIG. 5B). In FIG. 5A, the housing insert 30 has a sleeve-shaped configuration and comprises an opening 31.1, 31.2 in each of two opposite first outer sides, which extends inward from an outer side in the proximal direction through the wall of the housing insert 30. The housing insert 30 moreover comprises two additional second outer-side perforations 33 in the wall, which are offset by 90° with respect to the first outer sides in the direction of rotation of the longitudinal axis, through which guiding cams 52 of the release button 50 can cooperate with locking cams 42 of the receiving unit 40. Moreover, the housing insert 30 mounts the release button 50 in an axially movable manner. For this purpose, the housing insert 30, on the two second outer sides, comprises two respective guiding grooves 32.1, 32.2. The housing insert 30 can be received in a radial recess or convexity in the module housing 20, whereby the housing insert 30 is fixed in such a manner that it cannot be moved relative to the module housing 20. In the circumferential direction, the housing insert 30 is held in such a manner that it cannot be moved relative to the module housing 20 via ribs which are attached on outer sides of the housing insert 30 and which engage in corresponding grooves in the inner wall of the module housing 20.

In FIG. 5B, the release button 50 has a U-shaped cross section and is mounted on the housing insert 30 such that the arms of the U-shape surround the housing insert 30 on both sides and engage in the guiding grooves 32.1, 32.2. Between the arms, the release button 50 comprises, on an outer side, the actuation surface 51, which the user can actuate manually, in order to move the release button 50 radially in a direction at a right angle with respect to the longitudinal axis of the module housing 20 along a linear securing path. Furthermore, the arms comprise, on their inner side, a respective triangular guiding cam 52, which can cooperate with a respective triangular locking cam 42 of the receiving unit 40 or of the injection device, and thereby limits a distal movement of the receiving unit 40 with respect to the module housing 20. Between the housing insert 30 and the release button 50, the release button spring 80 is located, which pretensions the release button 50 radially outward in a securing direction.

As seen in FIG. 5C, the receiving unit 40 is mounted so that it can be moved in the axial direction relative to the module housing 20 and thus relative to the housing insert 30. The receiving unit 40 is also designed in the shape of a sleeve and has a square shape in cross section substantially matching the cross section of the injection device 1, wherein the side walls of the square are each bent slightly outward. Moreover, for the proximal limit of the internal space, the receiving unit 40 has an end surface 40b which is oriented at a right angle with respect to the longitudinal axis of the receiving unit 40 and which extends over the entire cross section of the internal space of the receiving unit 40.

Figure 8:
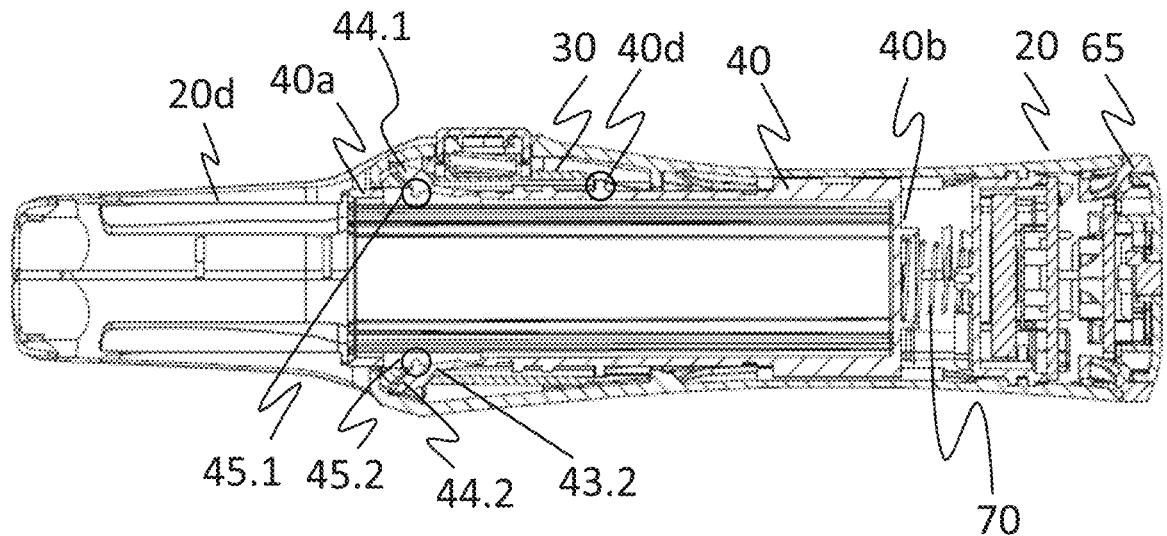
FIG. 8 shows a cross-sectional view of the add-on module in a release configuration, according to certain implementations.

On two mutually facing first sides of the essentially square shape of the receiving unit 40, a respective holding element in the form of a holding arm 43.1, 43.2 is arranged, wherein the holding arms 43.1, 43.2 are located in a distal region of the receiving unit 40 with respect to the axial length of the receiving unit 40. The holding arms 43.1, 43.2 are pivotably connected on a first end to the receiving unit 40. In the region of the free end of an outer side of the holding arms 43.1, 43.2 facing away from the internal space, said holding arms each have a cam 44.1, 44.2, each of which can be received in one of the openings 31.1, 31.2 of the housing insert 30. However, in the region of the free end of the holding arms 43.1, 43.2, on an inner side which faces the internal space of the receiving unit 40, the holding arms 43.1, 43.2 each have a projection 45.1, 45.2 (FIG. 8). On the other two sides of the square shape, a respective triangular locking cam 42 is arranged, which can cooperate in each case with a guiding cam 52 of the release button 50.

Figure 6:
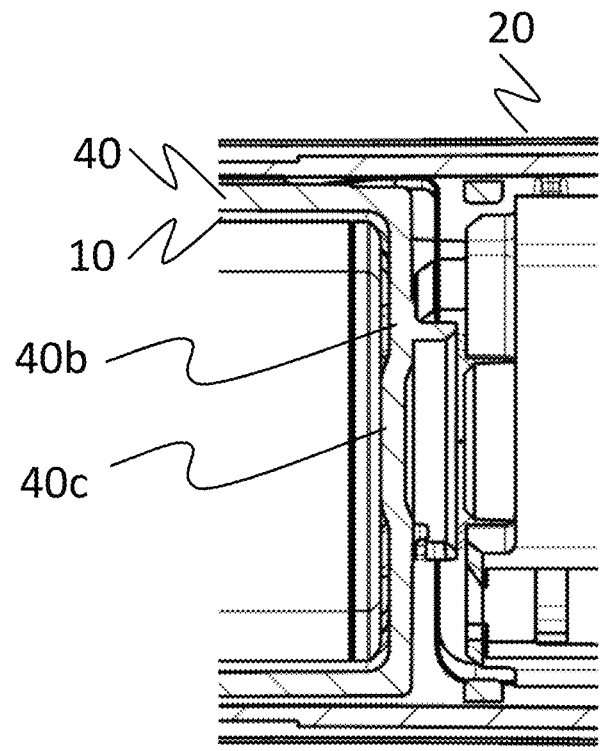
FIG. 6 shows a first cross-section through the add-on module and the injection device in the region of the end surface 40b, according to certain implementations.

FIG. 6 shows a longitudinal cross section in the region of the end surface 40b of the receiving unit 40 of the add-on 2 and injection device 1. The distal side of the end surface 40b comprises, in the middle, a convexity 40c or an elevation with a flat plateau, on which a proximal front surface of the injection device housing 10 lies. However, the end surface 40b can also be provided with separate elements for non-surface contacting and force transmission onto the injection device 1, for example, with a central convex curvature, with multiple pins or pegs distributed over the cross section or with one-dimensional links which are preferably arranged concentrically relative to the cross section of the injection device 1. On the other hand, the shape of the end surface 40b can be matched to an uneven shape of the proximal front surface of the injection device 1, in order to enable a large-surface contact.

In the perspective view of FIG. 5C, a flange section 40d extending outward in the radial direction and an arm 40e pointing in the proximal direction, which is used for preliminary snapping onto the housing during the mounting of the receiving unit 40, are also represented. An extension or tip on the arm 40e may act on a mechanical or optical switch, and may activate the processor units of the electronics unit 60 from a standby or rest state as soon as the receiving unit 40 is shifted proximally along a receiving path. The switch arranged on the circuit board 64a, 64b thus detects the end of the receiving movement of the arm 40e and thus of the receiving unit 40, and any absence of the injection device 1 can then be detected via the activated sensor elements or sensor coils (41a, 41b), or another RF identification signal of the injection device 1 can be detected. Instead of the circuit board 64a, 64b, a switch for the detection of the axial position of the receiving unit 40 can also be mounted on any site of the inner side of the module housing 20 and cooperate there with a projection, for example, the mentioned flange section 40d or with a groove of the receiving unit 40.

Alternatively, a switch for detecting the axial position of the receiving unit 40 can be arranged on the receiving unit 40 itself and cooperate with an element secured on the module housing 20 or a projection. In this case, the switch can be fitted on the circuit board 41c (for example manufactured using a so-called flexprint printed circuit) which may be fastened permanently on the outer surface of the receiving unit 40. In an embodiment with a release button 50 which, when the injection device 1 is inserted, is moved with respect to the module housing 20 and/or housing insert 30, this relative movement can also be detected by a switch. In all these cases, a mechanical switch may be used primarily for activating the electronics and additional sensor elements of the electronics unit 60, so that the axial positioning of the switch is not critical and the switch can trigger already before the holding configuration is reached.

If a switch is arranged on the circuit board 64a, 64b and provided with a suitably extended plunger or completed with a separately spring-mounted adapter, wherein the plunger and adapter preferably pass through the end surface 40b in the longitudinal direction, the presence of the injection device 1 in the holding configuration can also be detected. In this case, sensor elements for the additional identification of the injection device 1 can be omitted.

Figure 7:
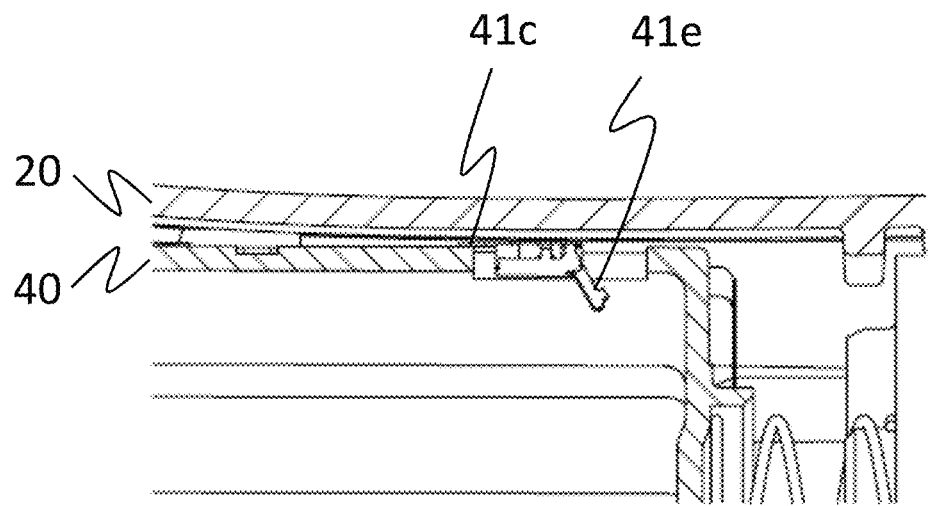
FIG. 7 shows a second cross-section through the add-on module, according to certain implementations.

FIG. 7 shows a longitudinal cross section through an embodiment of the add-on module 2 with a switch 41e for the detection of the presence of the injection device 1 in the receiving unit 40. The switch 41e is arranged laterally on the receiving unit 40, e.g., on the circuit board 41c (see above) next to a lateral opening in the receiving unit 40. In this case, the presence of the receiving unit 40 including the injection device 1 in the holding configuration must also be detected.

FIG. 8, shows a longitudinal cross section view of the add-on module 2 in a release configuration. The receiving unit 40, shiftably mounted in the module housing 20, is in the release position on a distal end of a receiving or configuration adjustment path. The receiving unit 40 is pushed into this position by a receiving spring illustrated as the elastic damping element 70, and in the process a flange section 40d (circled) or a radial pin impacts against a distal receiving path limit formed by the housing insert 30. In the process, the indicator edge 40a protrudes into the viewing area of the longitudinal opening 20d of the module housing 20; and the indicator edge 40a is thus visible for a user and thereby indicates to the user the release position. If the receiving unit 40 is to be shifted in the proximal direction relative to the module housing 20, it must be moved against the pretensioning force of the receiving spring, e.g., damping element 70. The receiving unit 40 can be shifted in the proximal direction relative to the module housing 20, until the damping element 70 is maximally compressed or until the flange section 40d impacts against a proximal receiving path limit formed by the housing. Said receiving path limit can simultaneously function as a stop and cooperate with the flange section 40d as a deceleration end-stop.

In FIG. 8, as shown, the two holding arms 43.1, 43.2 protrude outward from the body of the receiving unit 40, in that the cams 44.1, 44.2 of the holding arms 43.1, 43.2 (FIG. 5C) are received in respective openings 31.1, 31.2 (FIG. 5A) in the housing insert 30 and guided by force in said openings. Since the holding arms 43.1, 43.2 as a result point outward, the projections 45.1, 45.2 (circled) on the respective inner sides of the holding arms 43.1, 43.2 do not protrude into the internal space of the receiving unit 40 but are instead substantially flush with the inner surface of the receiving unit 40. In this position, the holding arms 43.1, 43.2 are thus in a release position.

Figure 9:
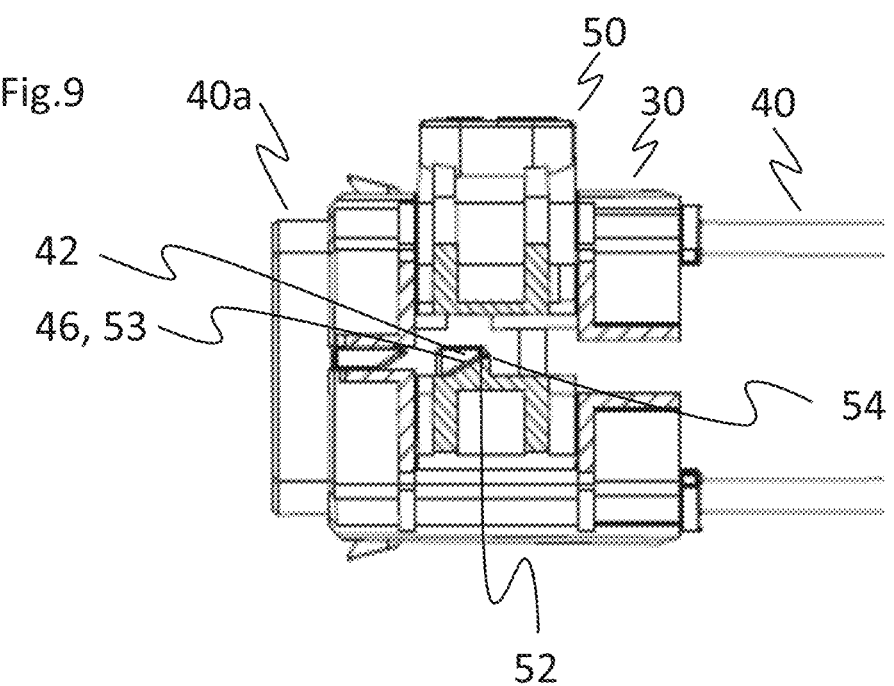
FIG. 9 shows a middle region of the add-on module in the release configuration, according to certain implementations.

In comparison to FIG. 8, FIG. 9 shows an enlarged middle region of the add-on module 2 in a release configuration, wherein the outer wall of the module housing 20 and of the housing insert 30 and an arm of the U-shape of the release button 50 are omitted in the representation. As mentioned above, the receiving unit 40 comprises on two outer sides a respective locking cam 42, and the release button 50 comprises, on its inner side, two radially mutually facing guiding cams 52, wherein one of the guiding cams 52 and one of the locking cams 42 as shown in FIG. 9.

In a release configuration, the locking cams 42 are located on the distal side of the guiding cams 52. The locking cams 42 each include a contact surface 46 which forms an acute angle with the longitudinal axis of the module housing 20. The guiding cams 52 comprise a respective guide surface 53, each being also oriented at this angle with respect to the longitudinal axis. In the release configuration shown, the guiding cams 52 are in a release position in which the contact surfaces 46 of the locking cams 42 and the guide surfaces 53 of the guiding cams 52 are in contact with one another. The guide surface 53 is pretensioned in the direction of the contact surface 46 by the release button spring 80. In a release configuration in which the receiving unit 40 is located on a distal end of its receiving path, which is determined by the relative arrangement of the flange section 40d and the distal receiving path limit, the guide surface 53 and the contact surface can also be axially separated.

In order to connect the injection device 1 to the add-on module 2, the latter must be moved from the release configuration into a holding configuration. For this purpose, the receiving unit 40 must be shifted relative to the module housing 20 from a distal into a proximal end position. This shift occurs by means of positioning the injection device 1, the proximal end of which can be inserted into the opening on the distal end of the module housing 20 and moved in the direction of the proximal end of the module housing 20. In the process, the proximal end of the injection device 1 first impacts against the end surface 40b of the receiving unit 40; subsequently the injection device 1 and the receiving unit 40 are shifted against the receiving spring, e.g., damping element 70, in the proximal direction. During this shift, the holding arms 43.1, 43.2 are moved along in the proximal direction, whereby the cams 44.1, 44.2 of the holding arms 43.1, 43.2 slide out of the respective angled openings 31.1, 31.2 in the housing insert 30 and move toward the internal space of the housing or the inserted injection device 1. As a result, the respective projections 45.1, 45.2 on the inner sides of the holding arms 43.1, 43.2 also move toward the injection device 1 and with increasing shifting of the receiving unit 40 in the proximal direction they engage in the recesses 10b in the injection device 1 (FIG. 1A). By the continued shifting of the receiving unit 40, the cams 44.1, 44.2 are guided further through the inner wall of the housing insert 30, so that the holding arms 43.1, 43.2 can no longer be deflected outward in the radial direction. The holding arms 43.1, 43.2 are thus locked by the housing insert 30 in a holding position, and the projections 45.1, 45.2 cannot be released unintentionally from the recesses 10b in the injection device 1.

When the receiving unit 40 is shifted from the distal end position into the proximal end position, the locking cams 42 of the receiving unit 40 cooperate with the guiding cams 52 of the release button 50. Indeed, as soon as the receiving unit 40 has been shifted from its distal end position in the proximal direction, the respective angled contact surfaces 46 of the locking cams 42 of the receiving unit 40 are pressed against the angled guide surfaces 53 of the guiding cams 52 of the release button 50. Since the release button 50 cannot move in the axial direction but is instead movably mounted in the radial direction against the securing direction, the guiding cams 52 shift due to the pressure of the locking cams 42 against the pretensioning force of the release button spring 80 in the radial direction until the locking cams 42 slide beyond the guide surfaces 53 and thereby release the guiding cams 52. At this time, the release button 50 springs back in the securing direction due to the spring force of the release button spring 80. The locking cams 42 are then located on the proximal side of the guiding cams 52. The guiding cams 52 in this position are in their holding position in which they prevent the locking cams 42 from moving in the distal direction, by means of their locking surface 54 oriented at a right angle with respect to the longitudinal position. In this position, the receiving unit 40 is located on a proximal end of its receiving path, and the add-on module 2 is in the holding configuration.

Figure 10:
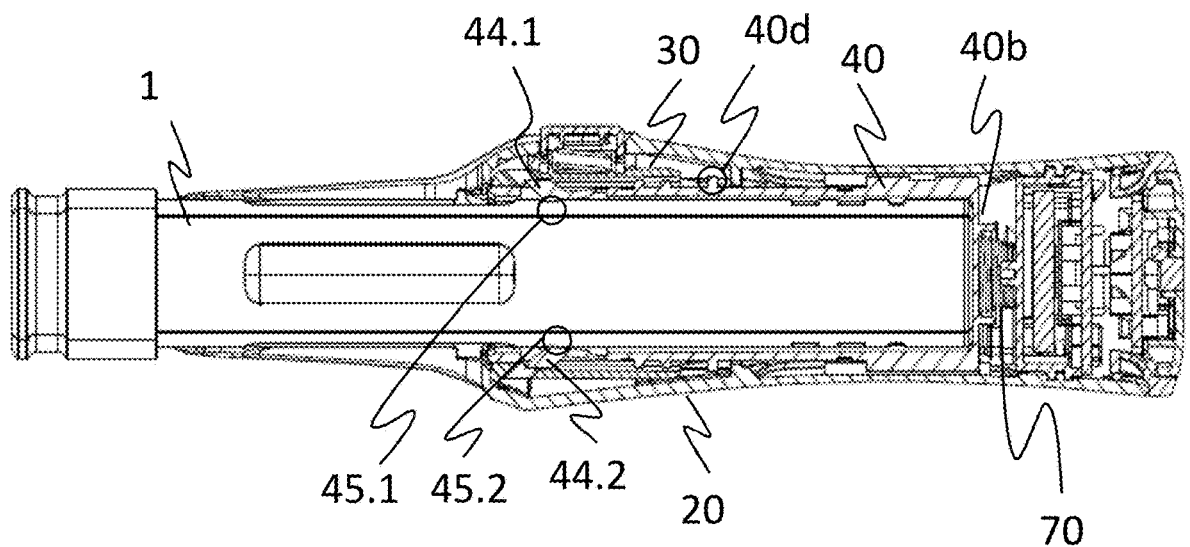
FIG. 10 shows a cross-sectional view of the add-on module in a holding configuration, according to certain implementations.

FIG. 10 shows the add-on module 2 in a cross-sectional view in the holding configuration with an injection device 1 held in the module housing 20 in a top view. Said injection device 1 contacts, with its front surface, the end surface 40b of the receiving unit 40 which is located on the proximal end of the receiving path. In this position of the receiving unit 40, the receiving spring is not yet maximally compressed, the flange section 40d (circled) is located between the distal receiving movement limit and a distally directed stop surface in the interior of the module housing. Due to the above-described cooperation of the locking cams 42 and the guiding cams 52, the receiving unit 40 is held in this position, which is pretensioned by the receiving spring. The holding arms 43.1, 43.2 are in their holding position in which the respective projections 45.1, 45.2 engage in the recesses 10b in the injection device 1 (the position of the projections and recesses is circled, but hidden by the top view of the injection device) and in which the inner wall locks the cams 44.1, 44.2 of the holding arms 43.1, 43.2 against radial movement.

Figure 11:
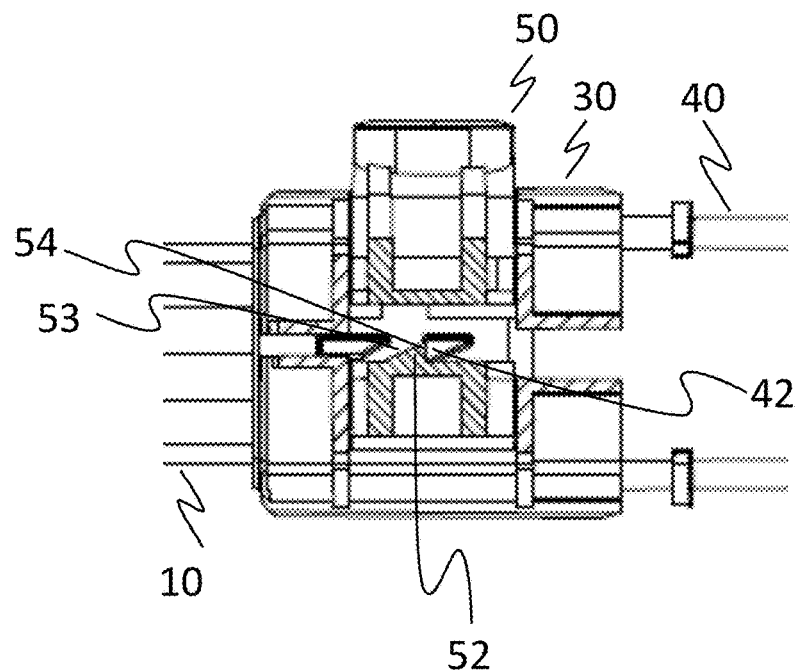
FIG. 11 shows a middle region of the add-on module in the holding configuration.

FIG. 11 shows a middle section of the add-on module in the holding configuration. Here, as in FIG. 9, an outer wall of the module housing 20 and of the housing insert 30, and a portion of the arm of the release button 50 are omitted so that one of the guiding cams 52 of the release button 50 and one of the locking cams 42 of the receiving unit 40 can be viewed. In FIG. 11, the guiding cam 52 is shown in its holding position. In this holding position, the guiding cam 52 with its locking surface 54 and with the pretensioning force of the release button 50, which is generated by the release button spring 80, prevents the locking cam 42 and thus the receiving unit 40 from moving in a distal direction. Thus, an undesired shifting of the receiving unit 40 is not possible at least in the distal direction, and the injector 1 cannot be unintentionally released from the module housing 20 of the add-on module 2.

In order to separate the injection device 1 from the add-on module 2, the add-on module 2 must be moved from the holding configuration into the release configuration. This is achieved by pressing the actuation surface 51 of the release button 50 so that the release button is shifted along its securing path in the radial direction toward the module housing 20. Thereby, the release button spring 80 is compressed, and the guiding cams 52 are shifted from their holding position into a release position, whereby the locking cams 42 of the receiving unit 40 can be released and moved in the distal direction.

By manual pressing of the release button 50 against the securing direction and transversely to the longitudinal direction, a short but nonetheless easily recognizable release or ejection movement of the receiving unit 40 in the distal direction of the receiving path is started, at the end of which the add-on module 2 is in the release configuration, and the removal of the injection device 1 from the add-on module can occur. The ejection movement of the receiving unit 40 can here occur exclusively due to the directly exerted force of the user, for example, by a careful deflection of the force transversely to the longitudinal direction via a cam control or a wedge into a force in the direction of the receiving pass, or by pressing an alternative release button or manual shifting of the receiving unit 40 in the longitudinal direction. However, the ejection movement can also occur completely automatically and be driven and assisted by a preloaded energy source, so that the release button is used exclusively as trigger and can thus also be implemented as an electronic contact sensor. Preloaded energy sources are maximally loaded when the add-on module is delivered and they release a smaller amount of energy with each ejection. In addition to a preloaded mechanical energy storage in the form of a spring or a pressurized gas reservoir, an electrical drive is also conceivable.

The release or ejection movement can also be assisted by the release of energy from a rechargeable energy source as release assistance, which is loaded into the add-on module at the time of the axial insertion of the injection device into the add-on module. For this purpose, a separate spring element, a compressible gas volume, or the receiving spring in the form of an elastic damping element 70 can be provided. At the time of the injection, the spring element compressed in the holding configuration can be relaxed and it can press against the end surface 40*b*, whereby the receiving unit 40 is shifted in the distal direction. However, the loading or tensioning of the release assistance can also occur only when the ejection occurs by initial pressing of the release button 50 via a first partial stroke, wherein a subsequent final movement of the release button via a second partial stroke serves as trigger for the assistance.

Figure 12A:
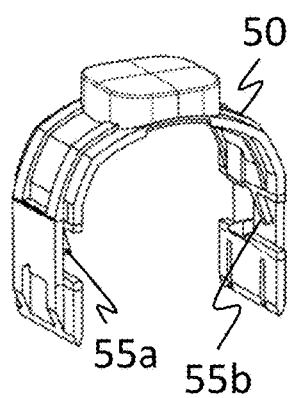
FIGS. 12A-C show a first variant of a tensionable ejection aid (release assistance) and operation of the first variant of the tensionable ejection aid, according to certain implementations.
Figure 12B:
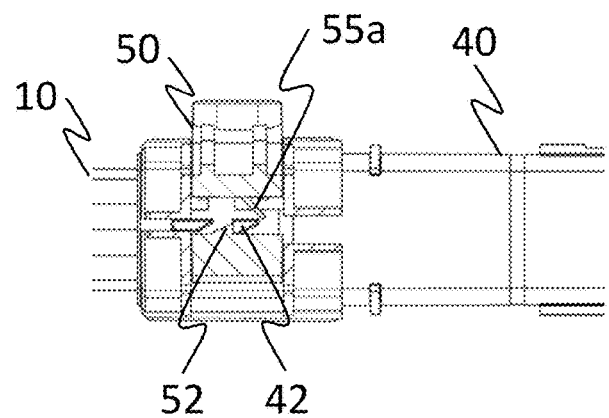
Figure 12C:
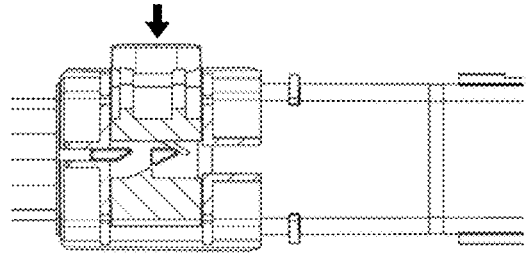

FIGS. 12A-12C show a first variant with a tensionable release assistance, including two elastic spring arms 55*a*, 55*b* or links, which are each fastened to an inner side of the two arms of the release button 50 and may be configured to form a single piece therewith. In the holding configuration represented in FIG. 12B, a portion of an arm is omitted, so that a spring arm 55*a*, a locking cam 42 of the receiving unit 40 and a guiding cam 52 of the release button 50 are visible. A proximal end of the locking cam 42 is located with a slight distal offset next to the non-tensioned spring arm 55*a*. When the release button 50 with spring arm 55*a* and guiding cam 52 is moved opposite its securing path in the direction of the arrow (FIG. 12C), the spring arm 55*a* is clamped on the locking cam 42. As illustrated in FIG. 12C, toward the end of this movement, the guiding cam 52 releases the locking cam 42 for a movement in the distal direction, and the energy previously stored in the spring arm 55*a* drives the locking cam 42 and thus the receiving unit 40 in the distal direction. At the site of the locking cam 42, the spring arm 55*a* can also act on another projection of the receiving unit 40.

Figure 13A:
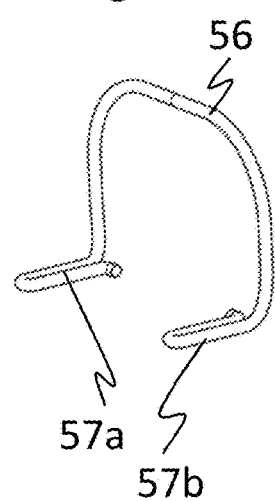
FIGS. 13A-C show a second variant of a tensionable ejection aid (release assistance) and operation of the second variant of the tensionable ejection aid, according to certain implementations.
Figure 13B:
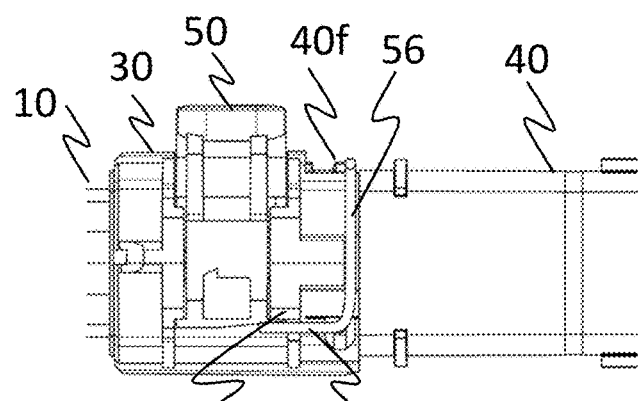
Figure 13C:
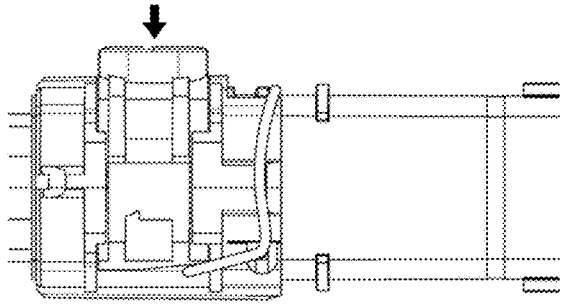

FIGS. 13A-13C show a second variant with a separate tensionable release assistance made of spring wire in the form of a clip spring with a U-shaped clip 56 and two tensioning arms 57*a*, 57*b* angled at a right angle therefrom. At the transitions between the clip 56 and the tensioning arms 57*a*, 57*b*, two pivot and contact points are located, at which the clip spring is clamped on the housing insert 30 (FIGS. 13B and 13C). In the holding configuration represented in FIG. 13B, the tensioning arms 57*a*, 57*b* are oriented approximately parallel to the longitudinal axis, so that, as shown in FIG. 13B, a distal end of the tensioning arms 57*b* is positioned in the securing direction beneath a nose 58, an edge, or a projection of the release button. The clip 56 is arranged distally on a pin 40*f* of the receiving unit 40 or is guided in a recess of the receiving unit 40. As represented in FIG. 13C, by a movement of the release button 50 in the direction of the arrow, during a first partial stroke, the tensioning arms 57*a*, 57*b* are pressed downward and the clip 56 is clamped with an at least essentially rigid angle between the tensioning arms 57*a*, 57*b* and the clip 56. A release of the receiving unit 40 occurs subsequently, as in the variant described herein.

Due to the movement of the receiving unit 40 in the distal direction, the holding arms 43.1, 43.2 are also shifted in the distal direction, and the cams 44.1, 44.2 of the holding arms 43.1, 43.2 run along the inner wall of the housing insert 30 and into the openings 31.1, 31.2 due to their shape, e.g., angle, and are force-guided by the openings 31.1, 31.2. The holding arms 43.1, 43.2 are moved outward at an angle away from the internal space of the receiving unit 40, e.g., radially away, whereby the projections 45.1, 45.2 (see, e.g., FIGS. 8 and 10) are also moved from the internal space or from the injection device 1 radially away and out of its recess 10*b*. As a result of the force of the receiving spring, e.g., the damping element 70, the receiving unit 40 is shifted distally to the distal end of its receiving path or up to a distal stop on the module housing 20. During this movement of the receiving unit 40, the free end of the holding arms 43.1, 43.2 is shifted further into the respective openings 31.1, 31.2 in the housing insert 30 until the holding arms 43.1, 43.2 are in their release position. When the receiving unit 40 has arrived on the distal end of its receiving path, the add-on module 2 is located in the release configuration, and the injector 1 can be removed from the module housing 20.

LIST OF REFERENCE NUMERALS

1 Injection device
10 Device housing
10*a* Window
10*b* Recess
11 Needle protection sleeve
12 Needle protection cap remover
2 Add-on module
20 Module housing
20*a* Gripping region
20*b* Link
20*c* Stop ridge
20*d* Longitudinal opening
21*a*, 21*b* Housing halves
22 Housing closure
23 Radial opening
24 Stop surface
30 Housing insert
31.1, 31.2 Opening
32.1, 32.2 Guide grooves
33 Perforation
40 Receiving unit
40*a* Indicator edge
40*b* End surface
40*c* Convexity
40*d* Flange section
40*e* Arm
40*f* Pin
41*a*, 41*b* Sensor coils
41*c* Circuit board
41*d* Connection
41*e* Switch
42 Locking cam
43.1, 43.2 Holding arm
44.1, 44.2 Cam
45.1, 45.2 Projection
46 Contact surface
50 Release button
51 Actuation surface
52 Guiding cam
53 Guide surface
54 Locking surface
55*a*, 55*b* Spring arm
56 Clip
57*a*, 57*b* Tensioning arms
58 Nose
60 Electronics unit
61 Electronics holder
62 Battery
63 Accumulator/rechargable battery
64*a*, 64*b* Circuit board
65 Light guide
66 Antenna
70 Damping element
80 Release button spring

The invention claimed is:

1. An add-on module configured to be mounted on an injection device with a needle affixed at a distal end and extending along a longitudinal axis of the injection device, the add-on module comprising:
- a sensor element for detecting a state of the injection device;
- a processor for evaluating a signal of the sensor element;
- an energy storage device for supplying energy to the processor;
- a sleeve-shaped first module part comprising an open distal end, a closed proximal end and holding arms configured to form a positive engagement with recesses of the injection device such that, along the longitudinal axis, the first module part is configured to be connected to the injection device in an axially fixed manner;
- a sleeve-shaped second module part comprising an open distal end and a closed proximal end within which the first module part is concentrically arranged; and
- a damping element comprising a spring element arranged between a proximal end surface of the closed proximal end of the first module part and a distal end surface of the second module part or a distal end surface of a component axially fixed to the second module part at the closed proximal end thereof,
- wherein during insertion of the injection device into the add-on module, the injection device is inserted into the open distal end of the first module part and the injection device and the first module part shifted together against a force of the spring element such that the spring element is moved from a relaxed state into a preloaded position where the injection device forms the positive engagement with the first module part,
- wherein upon forming the positive engagement, the second module part is configured to be moved in a distal direction of the longitudinal axis for a damped relative movement with respect to the first module part in which the damping element prevents the proximal end surface of the closed proximal end of the first module part from impacting the distal end surface of the second module part or the component axially fixed to the second module part at the closed proximal end, and during the relative movement, the injection device is non-movable relative to the first module part due to the first module part being connected to the injection device in the axially fixed manner.

2. The add-on module according to claim 1, wherein the second module part has a greater mass than the first module part.

3. The add-on module according to claim 1, wherein the sensor element is arranged in the first module part.

4. The add-on module according to claim 1, wherein the damped relative movement is performed within an internal space defined between the closed proximal end of the first module part and the closed proximal end of the second module part.

5. The add-on module according to claim 1, wherein the first module part includes a receiving unit and the second module part includes a module housing which at least partially surrounds the receiving unit.

6. The add-on module according to claim 5, wherein the second module part comprises a handle for gripping the injection device and the add-on module.

7. The add-on module according to claim 5, wherein the first module part comprises a holding element and the second module part comprises a release unit, wherein,
- in a holding configuration, the add-on module limits a distal movement of the receiving unit in the module housing by the release unit, and the holding element holds the injection device in the receiving unit; and
- in a release configuration, the add-on module releases the receiving unit from the release unit and releases the injection device from the holding element, wherein, by a release movement of the receiving unit, the add-on module can be moved from the holding configuration into the release configuration.

8. The add-on module according to claim 7, wherein the add-on module comprises a release assistance system, wherein when the release unit is actuated, the release assistance system is first tensioned and subsequently relaxed when the receiving unit is shifted with respect to the module housing.

9. The add-on module according to claim 7, wherein the release unit comprises a guiding cam, and the receiving unit or the injection device comprises a locking cam, wherein, in the holding configuration, the guiding cam assumes a holding position and cooperates with the locking cam such that the receiving unit and the injection device are prevented from moving in the distal direction.

10. The add-on module according to claim 9, wherein the guiding cam is configured to be moved from the holding position into a release position in which the locking cam is released from the guiding cam, and wherein the guiding cam is preloaded into holding position by a release button spring.

11. The add-on module according to claim 1, further comprising:
- a circuit board including the processor and a switch, wherein the processor is configured for evaluating the signal of the sensor element in an activated state,
- wherein the circuit board is arranged in the second module part between the closed proximal end of the first module part and the closed proximal end of the second module part, and
- wherein during the insertion of the injection device into the add-on module, the switch is actuated by the first module part or a component affixed thereto and causes the processor to be transitioned from a standby state to the activated state.

12. The add-on module according to claim 1, wherein the component axially fixed to the second module part is an electronics holder, and the damping element is arranged between the closed proximal end of the first module and the electronics holder.

13. The add-on module according to claim 1, wherein the spring element is configured as a compression spring.

14. The add-on module according to claim 1, wherein the spring element in the preloaded position is further loaded during the damped relative movement.

15. The add-on module according to claim 1, wherein the damped relative movement has an amplitude between 0.2 and 10 millimeters.

16. A method of using an injection device comprising a device housing with a needle affixed at a distal end and extending along a longitudinal axis of the injection device, the device housing comprising device housing recesses for coupling to an add-on module, the add-on module comprising:
- a sensor element for detecting a state of the injection device;
- a processor for evaluating a signal of the sensor element;
- an energy storage for supplying energy to the processor element;
- a sleeve-shaped first module part comprising an open distal end, a closed proximal end and projections configured to be received by the device housing recesses such that, in a direction along the longitudinal axis, the first module part can be connected to the injection device in an axially fixed, positive engagement via the device housing recesses and the first module part projections;

a sleeve-shaped second module part comprising an open distal end and a closed proximal end within which the first module part is concentrically arranged, wherein the second module part can be moved in a distal direction of the longitudinal axis for a relative movement with respect to the first module part which is connected to the injection device; and a damping element comprising a spring element arranged between a proximal end surface of the closed proximal end of the first module part and a distal end surface of the second module part or a distal end surface of a component axially fixed to the second module part at the closed proximal end, wherein the method comprises:

inserting the injection device into the open distal end of the first module part and shifting the injection device and the first module part together against a force of the spring element such that the spring element is moved from a relaxed state into a preloaded position;

connecting the injection device to the first module part via the device housing recesses and the first module part projections thereby forming the positive engagement between the first module part and the injection device; and moving the second module part relative to the first module part in the distal direction in a deceleration or braking movement in which the damping element prevents the proximal end surface of the closed proximal end of the first module part from impacting the distal end surface of the second module part or the distal end surface of the component axially fixed to the second module part at the closed proximal end thereof, wherein during the deceleration or braking movement, the injection device is non-movable relative to the first module part due to the first module part being connected to the injection device in the positive engagement.

17. The method according to claim 16, wherein during the moving of the second module part relative to the first module part in the distal direction in the deceleration or braking movement, the spring element in the preloaded position is further loaded.

18. An add-on module, the add-on module comprising:
a sensor element for detecting an injection state;
a processor for evaluating a signal of the sensor element;
an energy storage device for supplying energy to the processor;
a sleeve-shaped first module part comprising an open distal end, a closed proximal end and projections configured to form a positive engagement with recesses of an injection device in an axially fixed engagement thereto, the injection device comprising a needle affixed to a distal end and extending along a longitudinal axis of the injection device;

a sleeve-shaped second module part comprising an open distal end and a closed proximal end within which the first module part is concentrically arranged, wherein the second module part is configured to be moved in a distal direction along the longitudinal axis for a relative movement with respect to the first module part when the first module part is axially affixed to the injection device in a holding configuration; and a damping element arranged between a proximal end surface of the closed proximal end of the first module part and a distal end surface of the second module part or a distal end surface of a component axially fixed to the second module part at the closed proximal end thereof, the damping element for damping the relative movement, wherein as the first module part is axially affixed to the injection device by shifting the first module part and the injection device against a force of the damping element into the positive engagement, the damping element is preloaded by a receiving path in which the first and second module parts are shifted with respect to one another along the longitudinal axis, and wherein the second module part comprises a guiding cam and the first module part comprises a locking cam, wherein, in the holding configuration, the guiding cam cooperates with the locking cam such that the axially affixed first module part and injection device are in the positive engagement and are prevented from a movement in the distal direction along the longitudinal axis, and are also permitted to move in a proximal direction along the longitudinal axis in a damped movement relative to the second module part under further loading of the preloaded damping element in which the damping element prevents the proximal end surface of the closed proximal end of the first module part from impacting the distal end surface of the second module part or the component axially fixed to the second module part at the closed proximal end.

19. The add-on module according to claim 18, further comprising a release unit comprising a release button with an actuation surface movable in a radial direction relative to the longitudinal axis by a release movement to release the first module part from the holding configuration such that the add-on module is in a release configuration.

20. The add-on module according to claim 19, wherein the add-on module is configured to be moved from the release configuration into the holding configuration by a receiving movement along the receiving path.

* * * * *